United States Patent [19]

Nakazato

[11] Patent Number: 5,172,240
[45] Date of Patent: Dec. 15, 1992

[54] INFORMATION SIGNAL DISCRIMINATING APPARATUS

[75] Inventor: Saburou Nakazato, Tokyo, Japan

[73] Assignee: Canon Kabushiki Kaisha, Tokyo, Japan

[21] Appl. No.: 700,347

[22] Filed: May 7, 1991

Related U.S. Application Data

[63] Continuation of Ser. No. 244,076, Sep. 13, 1988, abandoned.

[30] Foreign Application Priority Data

Sep. 22, 1987 [JP] Japan .................................. 62-239467

[51] Int. Cl.⁵ .......................... H04N 5/78; H04N 5/92
[52] U.S. Cl. .................................. 358/330; 358/310; 360/27; 360/33.1
[58] Field of Search .................. 358/310, 330; 360/27, 360/33.1

[56] References Cited

U.S. PATENT DOCUMENTS

| | | | |
|---|---|---|---|
| 4,673,984 | 6/1987 | Kikuchi et al. | 358/188 |
| 4,686,585 | 8/1987 | Sato | 360/27 |
| 4,786,986 | 11/1988 | Yamanushi et al. | 360/27 |
| 4,811,122 | 3/1989 | Kido et al. | 360/25 |
| 4,949,195 | 8/1990 | Fujiwra | 360/69 |

Primary Examiner—John W. Shepperd
Attorney, Agent, or Firm—Robin, Blecker, Daley & Driscoll

[57] ABSTRACT

Disclosed is an information signal discriminating apparatus adapted to ascertain the type of an information signal which includes a synchronizing signal and which is modulated by one of a plurality of types of modulation carrier signals having respective different frequencies. The information signal type is ascertained quickly by detecting the frequency of a synchronizing signal section included in the information signal concerned. In other words, the frequency thus detected indicates the information signal type.

13 Claims, 4 Drawing Sheets

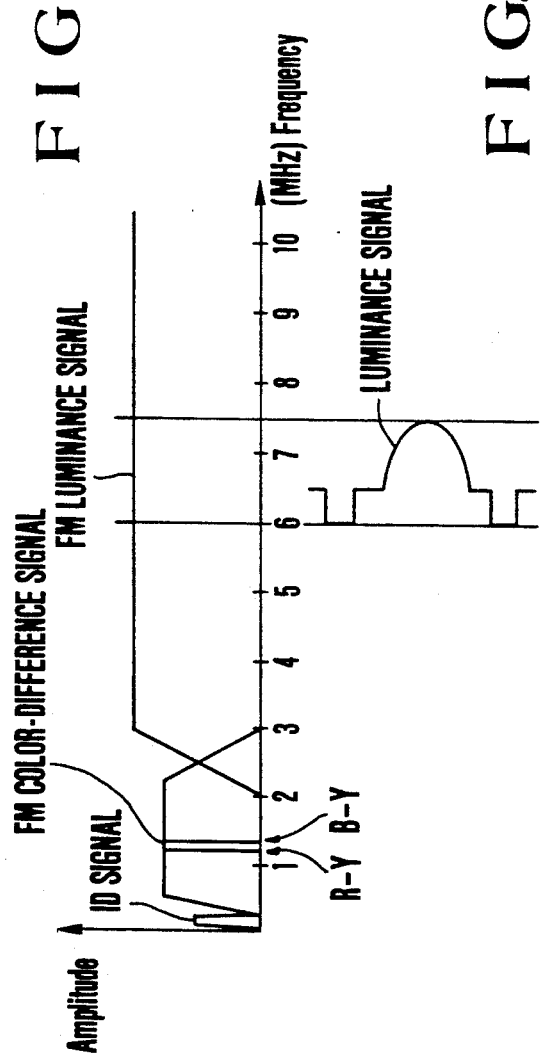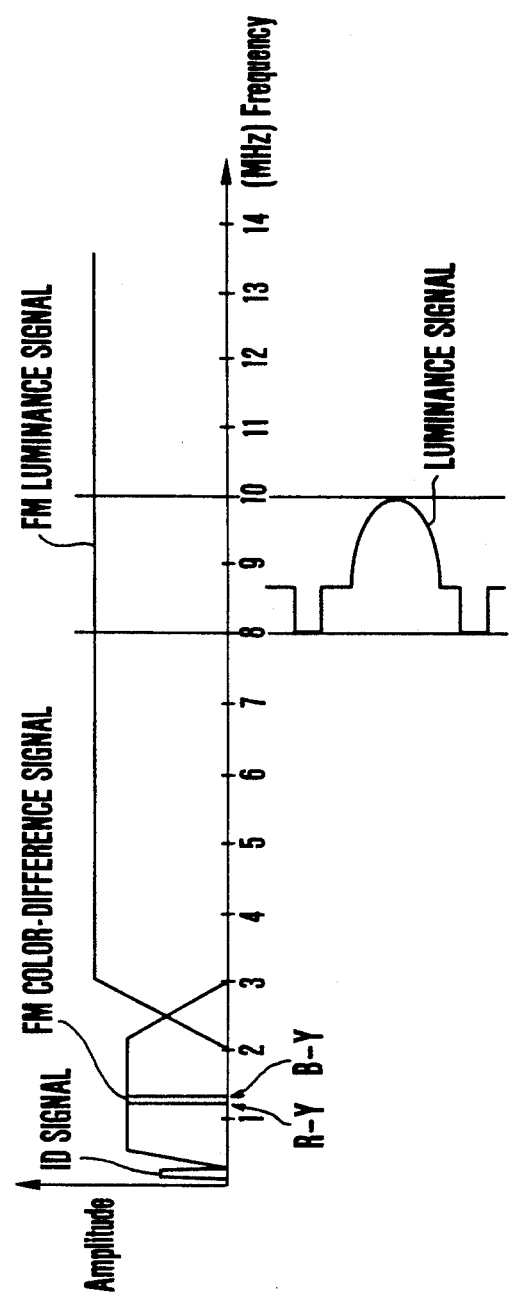

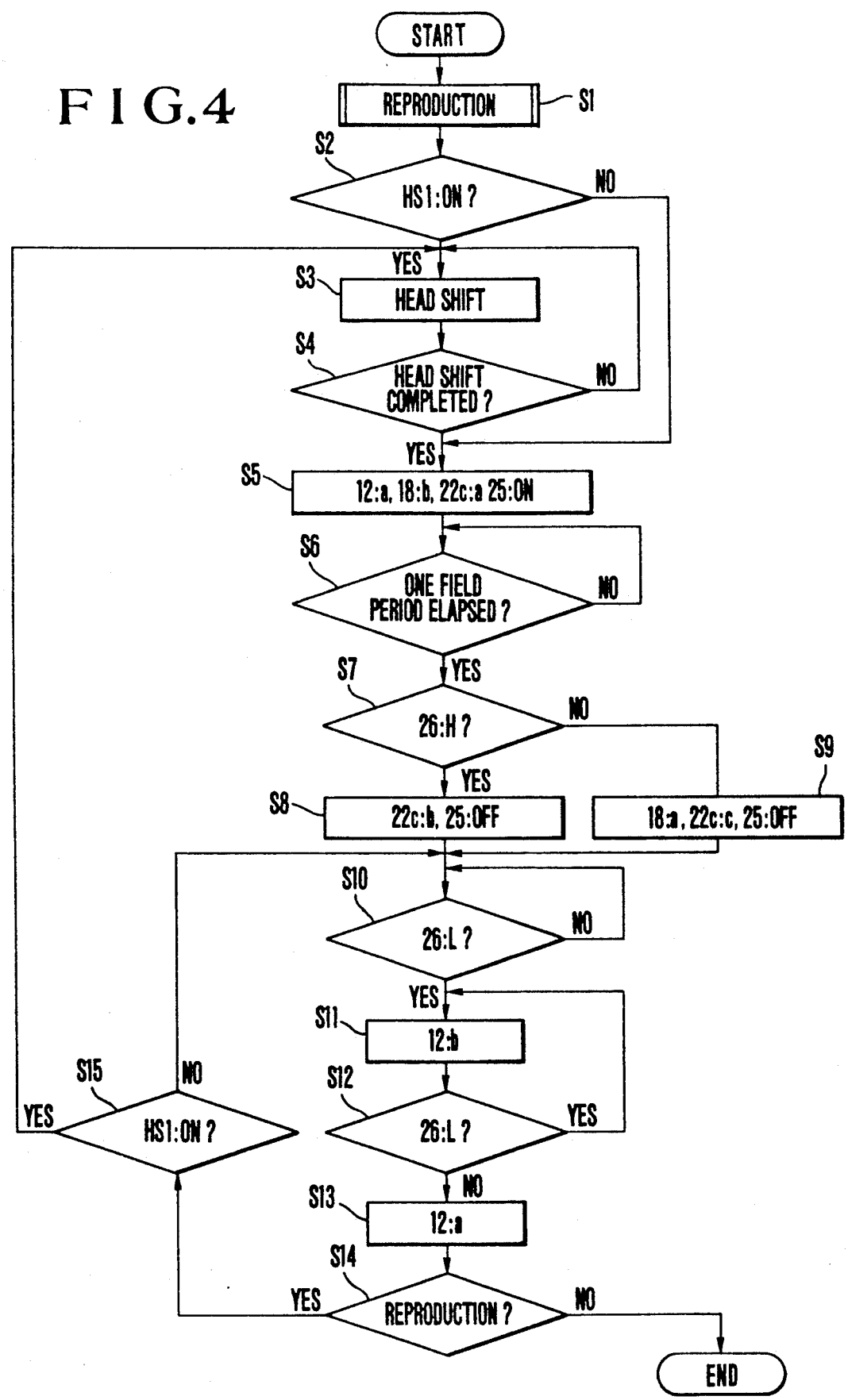

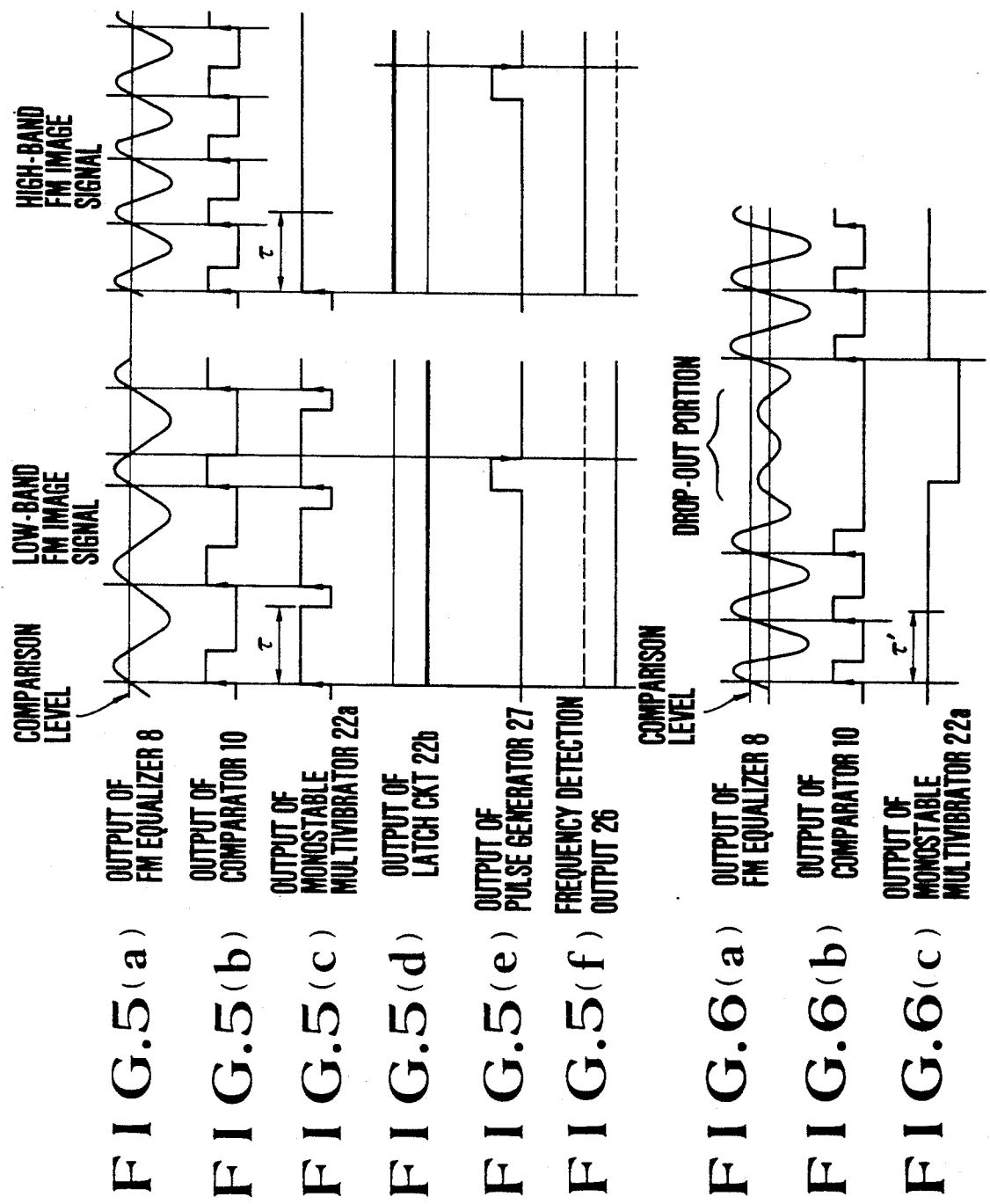

he pulse signals output from the pulse signal output
INFORMATION SIGNAL DISCRIMINATING APPARATUS This is a continuation application under 37 CFR 1.62 of prior application Ser. No. 244,076, filed Sep. 13, 1988 now abandoned.

BACKGROUND OF THE INVENTION

1. Field of the Invention

The present invention relates to an information signal discriminating apparatus adapted to ascertain the type of an information signal.

2. Description of the Related Art

The still video floppy system (hereinafter referred to as still video system) is a well-known conventional system for recording and reproducing FM-modulated image signals on and from a floppy disk having a diameter of 2 inches. In this still video system, the frequency allocation which is shown in FIG. 1 is adopted for the recording signal on such a floppy disk (hereinafter, the frequency allocation shown in FIG. 1 will be referred to as low-band FM signal frequency allocation). The luminance signal and the color-difference signals in the still video system are separately FM-modulated and recorded, as shown in FIG. 1. The R-Y signals and the B-Y signals among the color-difference signals are recorded alternately for each horizontal section. In the above low-band FM signal frequency allocation, the frequency of the FM luminance signal is 6 MHz at the sync. tip and 7.5 MHz at the white peak. As for the FM color-difference signals, the center frequency of the R-Y signal is 1.2 MHz, and that of the B-Y signal is 1.3 MHz. Further, index signals (hereinafter abbreviated as ID signals) having a carrier frequency of 204.5 KHz and adapted to represent such information as hours, minutes and seconds or day, month and year are frequency-multiplexed and recorded on the floppy disk. With the above-described low-band FM signal frequency allocation, a luminance signal band with a frequency of ca. 4.5 MHz and a horizontal resolution of ca. 350 in terms of TV lines is obtained. However, there is a demand for a wider luminance signal band since present-day TV monitors are equipped with higher resolution and wider screens than previous monitors. To meet this demand, recording and reproduction by such a frequency allocation as that shown in FIG. 2 has been conceived as the performance of recording media, heads, etc. has improved. In the frequency allocation shown in FIG. 2 (hereinafter referred to as high-band FM signal frequency allocation), the frequency of the FM luminance signal is 8 MHz at the sync. tip, and 10 MHz at the white peak. The FM color-difference signals and the ID signal have purposely not been changed in order to allow for interchangeability with the low-band FM signal frequency allocation. With this high-band FM signal frequency allocation, a luminance signal band with a frequency of ca. 6.5 MHz and a horizontal resolution of ca. 520 in terms of TV lines is obtained. As the luminance signal band becomes wider in the manner as described above, it has become necessary for an apparatus equipped with a wider band to be also able to reproduce image signals recorded with the low-band FM signal frequency allocation so that interchangeability with a conventional apparatus may be retained. As a result, it has become necessary to conduct discrimination to determine which of the frequency allocations has been utilized in effecting the recording on the floppy disk.

For this purpose, one idea that has been conceived contemplates information identifying which of the allocations has been employed being set in the above mentioned ID signal.

Since, however, the frequency of such an ID signal is rather low, the recording condition judgment can only be effected slowly with this system.

SUMMARY OF THE INVENTION

It is accordingly an object of the present invention to provide an information signal discriminating apparatus capable of overcoming the above problems.

It is another object of the present invention to provide an information signal discriminating apparatus that makes it possible to quickly ascertain the type of an information signal.

In accordance with one embodiment of the present invention which aims at attaining the above object, there is provided an information signal discriminating apparatus adapted to ascertain the type of an information signal modulated by one of a plurality of types of modulation carrier signals having respective different frequencies and including a synchronizing signal, the information signal discriminating apparatus comprising: frequency detection means, arranged to input the information signal, for detecting a frequency of a synchronizing signal section included in the input information signal; and discrimination means for producing a discrimination signal in accordance with the frequency of the synchronizing signal section detected by the frequency detection means.

Still another object of the present invention is to provide an information signal processing apparatus capable of quickly ascertaining the type of an information signal and processing the information signal in the most suitable manner depending on which type is thus ascertained.

In accordance with another embodiment of the present invention which aims at attaining the above object, there is provided an information signal processing apparatus adapted to process an information signal modulated by one of a plurality types of modulation carrier signals having respective different frequencies and including a synchronizing signal, the information signal processing apparatus comprising: synchronizing pulse signal forming means, arranged to input the information signal, for forming and outputting a synchronizing pulse signal synchronized with the synchronizing signal included in the input information signal; pulse signal output means for outputting a plurality of types of pulse signals having respective different pulse widths in synchronization with the synchronizing pulse signal output from said synchronizing pulse forming means; condition detecting signal output means for detecting the condition of the information signal in accordance with the condition of the pulse signals output from the pulse signal output means to output a condition detecting signal indicative of the condition of the information signal; processing means, arranged to input the information signal, for processing the input information signal in accordance with the condition detecting signal output from the condition detecting signal output means; and control means for controlling the pulse widths of the pulse signals output from the pulse signal output means in accordance with the condition detecting signal output from the condition detecting signal output means.

Other objects and features of the present invention will become apparent from a reading of the following detailed description with reference to the attached drawings.

BRIEF DESCRIPTION OF THE DRAWINGS

FIG. 1 shows the frequency allocation of a low-band FM image signal;

FIG. 2 shows the frequency allocation of a high-band FM image signal;

FIG. 4 is an operational flowchart of the reproducing apparatus shown in FIG. 3;

FIGS. 5(a) through 5(f) illustrate the frequency detecting operation in the reproducing apparatus shown in FIG. 3; and FIGS. 6(a) through 6(c) illustrate the drop-out detecting operation in the reproducing apparatus shown in FIG. 3.

DETAILED DESCRIPTION OF THE PREFERRED EMBODIMENTS

Figure 3:
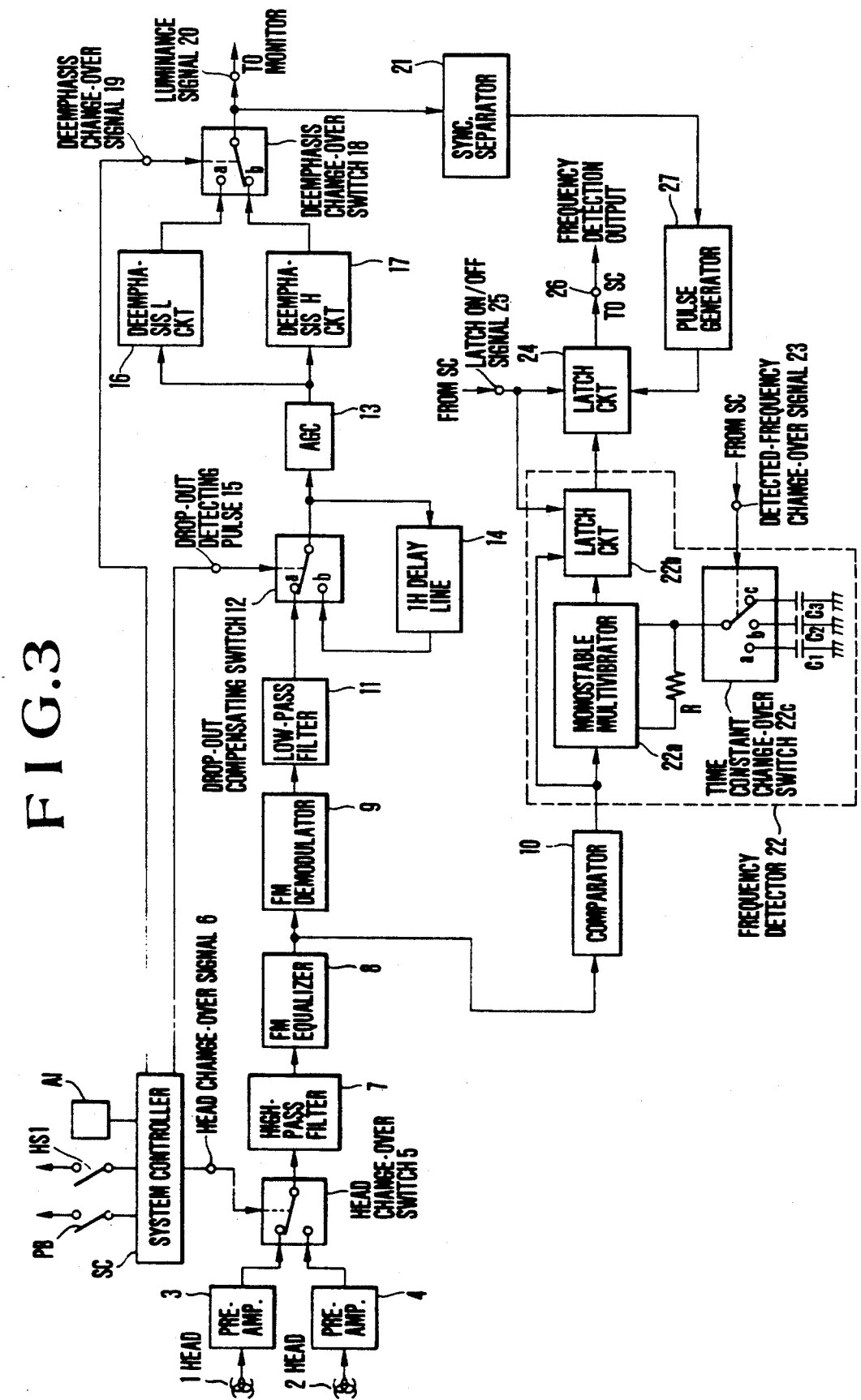
FIG. 3 is a schematic block diagram of the reproducing apparatus of a still video floppy system constituting an embodiment of the present invention.

The present invention will now be described with reference to the preferred embodiments.

FIG. 3 schematically shows the reproducing apparatus of a still video system constituting an embodiment of this invention. This apparatus includes heads 1 and 2 adapted to reproduce an odd field image signal and an even field image signal, respectively, of a frame image signal recorded on two recording tracks of a floppy disk (not shown). The heads 1 and 2 are connected to preamplifiers 3 and 4, respectively. The output terminals of the preamplifiers 3 and 4 are connected to a head change-over switch 5. Reference numeral 6 denotes a head change-over signal transmitted from a system controller SC, which signal is supplied to the head change-over switch 5. The reproducing apparatus further includes a high-pass filter 7 and an FM equalizer 8. The output of the head change-over switch 5 is supplied through the high-pass filter 7 and the FM equalizer 8 to an FM demodulator 9 and a comparator 10. The reproducing apparatus further includes a low-pass filter 11, a drop-out compensating switch 12, an automatic gain controller (hereinafter abbreviated as AGC) 13, and a 1H (which means 1 horizontal scanning period) delay line 14. The output of the FM demodulator 9 is input through the low-pass filter 11 to the drop-out compensating switch 12. The output of the drop-out compensating switch 12 is input through the 1H delay line 14 to the drop-out compensating switch 12 itself, to which a drop-out detecting pulse 15 is supplied from the system controller SC. The output of the drop-out compensating switch 12 is supplied to a deemphasis L circuit 16 and a deemphasis H circuit 17, through the AGC 13. The deemphasis amount of the deemphasis H circuit 17 is larger than that of the deemphasis L circuit 16. The output terminals of the deemphasis L circuit 16 and the deemphasis H circuit 17 are connected to a deemphasis change-over switch 18. Reference numeral 19 denotes a deemphasis change-over signal which is supplied from the system controller SC to the deemphasis change-over switch 18. The output of the deemphasis change-over switch 18 is a luminance signal 20 which is supplied to a sync. separator 21 and a monitor (not shown).

The output of the comparator 10 is input to a frequency detector 22. Reference numeral 23 denotes a detected-frequency change-over signal which is supplied from the system controller SC to the frequency detector 22. The frequency detector 22 is composed of a monostable multivibrator 22a, a latch circuit 22b and a time constant change-over switch 22c. The reproducing apparatus shown in FIG. 3 further includes a pulse generator 27 and a latch circuit 24. Reference numeral 25 denotes a latch ON/OFF signal. Supplied to the latch circuit 24 are the output of the frequency detector 22, the output of the pulse generator 27 and the latch ON/OFF signal from the system controller SC. The output of the latch circuit 24 is supplied to the system controller SC in the form of a frequency detection output 26. The latch ON/OFF signal 25 is also supplied to the latch circuit 22b. PB denotes a reproduction instructing switch, HS1 a head shift instructing switch, and AI a reproduction track address instructing key.

The system controller SC has a built-in CPU. The flowchart of the essential part of the operation program thereof is shown in FIG. 4.

The operation of the embodiment shown in FIG. 3 will now be described referring to the operational flowchart in FIG. 4.

An FM image signal recorded on a floppy disk (not shown) is reproduced in Step S1 by means of the heads 1 and 2. It is then amplified by the preamplifiers 3 and 4 and supplied to the head change-over switch 5. From the head change-over switch 5, the signal from the head 1 and that from the head 2 are alternately output, being changed over for each field period in accordance with the head change-over signal 6 from the system controller SC. The FM luminance signal in the output of the head change-over switch 5 is separated therefrom at the high-pass filter 7. Further, the frequency characteristics of the FM luminance signal are compensated for at the FM equalizer 8. The output of the FM equalizer 8 is supplied to the FM demodulator 9 and the comparator 10. Among the signals in the output of the FM demodulator 9, only the base band signals are allowed to pass through the low pass filter 11 and input to one of the input terminals of the drop-out compensating switch 12. Input to the other input terminal of the drop-out compensating switch 12 is the output of the drop-out compensating switch 12 itself, delayed by 1H at the 1H delay line 14.

Upon turning ON the switch HS1 in step S2, it is judged whether the head shift is instructed or not. If it is instructed, the heads 1 and 2 are simultaneously shifted in step S3 to the track addresses designated through the address instructing key AI. Steps S3 and S4 are repeated until the completion of the head shift is detected in Step 4 in a head moving mechanism (not shown). When the head shift detection has been completed, the operation moves on to step S5. If in step S2 the switch HS1 is judged to be OFF, the operation directly moves on to step 5.

In step S5, the drop-out compensating switch 12 is placed at the contact a, and the deemphasis change-over switch 18 at the contact b. Further, the latch ON/OFF signal 25 is set to ON.

With this arrangement, the judgment of the recording conditions is executed. Since the drop-out compensating switch 12 is placed at the contact a, it outputs the signal from the low-pass filter 11 in order to judge the recording conditions. The output of the drop-out compensating switch 12 becomes a signal of a magnitude within a predetermined range by passing through the AGC 13 and is supplied to the deemphasis L circuit 16 and the deemphasis H circuit 17. In the deemphasis L circuit 16, deemphasis is effected for a low-band FM image signal with the frequency allocation shown in FIG. 1, and in the deemphasis H circuit 17, deemphasis is effected for a high-band FM image signal with the frequency allocation shown in FIG. 2. The outputs of the deemphasis L circuit 16 and the deemphasis H circuit 17 are input to the deemphasis change-over switch 18. Since, however, the deemphasis change-over switch 18 is placed at the contact b in accordance with the deemphasis change-over signal 19 from the system controller SC, the output of the deemphasis H circuit 17 is selected for judging the recording conditions. In performing the normal reproduction, the output of the deemphasis L circuit 16 is selected for a low-band FM image signal, and that of the deemphasis H circuit 17 for a high-band FM image signal, in accordance with the judgment result.

Thus, the luminance signal 20 is output from the deemphasis change-over switch 18. At the sync. separator 21, the horizontal synchronizing signal is separated from the luminance signal 20 and supplied to the pulse generator 27.

In the pulse generator 27, a latch pulse for holding the judgment result is generated on the basis of the horizontal synchronizing signal supplied from the sync. separator 21 and is supplied to the latch circuit 24. At the comparator 10, on the other hand, the FM luminance signal, the frequency characteristics of which have been compensated for by the FM equalizer 8, is compared with a predetermined level. When it is higher than the predetermined level, a signal "0" is output, and when lower, a signal "1" is output, to be supplied to the frequency detector 22. The monostable multivibrator 22a is a retriggerable monostable multivibrator which is connected to the time constant change-over switch 22c. When performing the above recording condition judgment, the switch 22c is, in accordance with the detected-frequency change-over signal 23 from the system controller SC, placed at the contact a, i.e., the time constant of the capacitor $C_1$ and the resistor R shown in the FIG. 3 is selected. Consequently, the monostable multivibrator 22a generates a pulse with a width $\tau$ which is determined by the capacitor $C_1$ and the resistor R, in response to the leading edge or the trailing edge of the "0" or "1" signal from the comparator 10. Since the latch ON/OFF signal 25 is in the ON condition, the latch circuit 22b is in an enabled condition, and when performing this recording condition judgment, it holds the output condition of the monostable multivibrator 22a in response to the leading edge or the trailing edge of the output of the comparator 10. Since the latch ON/OFF signal 25 is also in the ON condition in the latch circuit 24, the output of the latch circuit 22b is in an enabled condition, so that the output condition is held in the horizontal synchronizing period by the pulse from the pulse generator 27.

The frequency detecting operation will now be described in detail with reference to FIGS. 5(a) to 5(f) which are timing charts showing the waveforms of the different signals at the time of recording condition judgment with respect to the low-band FM image signal and the high-band FM image signal.

FIG. 5(a) shows the waveform of the output of the FM equalizer 8 in the sync. tip section. At the comparator 10, the FM luminance signal is transformed into the "0" or "1" signal by comparing it with a comparison level shown in FIG. 5(a). As a result, the waveform of FIG. 5(b) is obtained. Further, the monostable multivibrator 22a generates a pulse with a width $\tau$ determined by the capacitor $C_1$ and the resistor R in response to the leading edge of the output of the comparator 10. This width $\tau$ is set by the time constant change-over switch 22c in such a manner that it is shorter than the sync. tip section frequency of the low-band FM image signal and longer than the sync. tip section frequency of the high-band FM image signal. Accordingly, the output of the monostable multivibrator 22a exhibits a waveform of repeated "0" and "1" for the low-band FM image signal, and a waveform of continued "1" for the high-band FM image signal, as shown in FIG. 5(c). When these waveforms are latched by the latch circuit 22b in response to the leading edge of the output of the comparator 10, continued "0" is output for the low-band FM image signal because of the delay in the output of the monostable multivibrator 22a, and continued "1" for the high-band FM image signal, as shown in FIG. 5(d). By latching these waveforms in response to the trailing edge of the output waveform of the pulse generator 27 which is in synchronization with the horizontal synchronizing signal shown in FIG. 5(e), the frequency detection output 26 which is shown in FIG. 5(f) is obtained. With this sync. tip section frequency detection output obtained by the above described operation, the recording condition is discriminated between the low-band FM image signal and the high-band FM image signal. In this state, stand-by condition is continued until the reproduction corresponding to the one field period, i.e. one of concentric tracks on the floppy disk, is effected in step S6.

In the still video system, one rotation of the floppy disk corresponds to one field of an FM image signal recorded thereon, and the disk motor (not shown) is driven at such a speed that the floppy disk makes one turn in one field period.

When one field period is over, the operation is proceeded to step S7, in which discrimination is conducted to determine whether the output of the latch circuit 24, i.e., the frequency detection output 26 is "1" or "0". When it is "1", i.e., when the recording condition is found to be that of the high-band FM image signal, the operation proceeds to step S8, in which the time constant change-over switch 22c is placed at the contact b and the latch ON/OFF signal 25 is set to OFF.

This causes the time constant of the monostable multivibrator 22a to be changed over to the value which is determined by the capacitor $C_2$ and the resistor R, and a pulse width $\tau'$ to be selected. Change-over is effected to the drop-out detection mode. The latch circuits 22b and 24 do not operate, the output signal of the monostable multivibrator 22a is output as the frequency detection output 26, without being changed. Step S6 in this embodiment may be omitted.

FIG. 6(a) shows the output waveform of the FM equalizer 8 when drop-out is generated in the high-band FM image signal. At the comparator 10, the waveform is compared with a comparison level shown in FIG. 6(a) and the comparator output shown in FIG. 6(b) is obtained. The monostable multivibrator 22a generates a pulse with a width $\tau'$ determined by the capacitor $C_2$ and the resistor R, in response to the leading edge of the output of the comparator 10. By setting the pulse width $\tau'$ to the value somewhat larger than the period of the emphasized sync. tip section peak frequency, the waveform shown in FIG. 6(c) is obtained, which enables the drop-out section to be detected. This is output as the frequency detection output 26, without being changed. When in step S7 the frequency detection output 26 is at a low level, i.e, when the recording condition is found to be that of the low-band FM image signal, the time constant change-over switch 22c is placed at the contact c, which is for the low-band FM image signal, so that the time constant is the value which is determined by the capacitor $C_3$ and the resistor R and the pulse width of the monostable multivibrator 22a becomes $\tau''$, thus setting a pulse width most suitable for each case. Since the pulse width $\tau''$ is somewhat longer than the period of the sync. tip section peak frequency in the low-band FM image signal, the drop-out detecting operation is performed positively.

Since in step S9 the deemphasis change-over switch 18 is placed at the contact a, the deemphasis is optimized. Further, the latch ON/OFF signal 25 is set to OFF, so that the latch circuits 22b and 24 do not operate.

Thus, change-over to the drop-out detection mode is effected in steps S8 and S9, an optimum pulse width of the monostable multivibrator 22a being selected for both the high-band and low-band FM image signals. Therefore, the signal output as the frequency detection output 26 is at a low level in the drop-out position, and is at a high level otherwise.

In step S10, stand-by condition is continued until the frequency detection output 26 is at a low level. When it is at a low level, the drop-out compensating switch 12 is placed at the contact b in step S11, switching the signal to the one 1H ahead.

Further, these steps S11 and S12 are repeated until the frequency detection output 26 attains a high level in step S12. When it is at a high level, the drop-out compensating switch 12 is placed at the contact a again. In this way, compensation with the signal 1H ahead is effected only for the section where the drop-out occurs.

It is judged in step S14 whether the reproduction instructing switch PB is ON or not. If it is OFF, the program is terminated. If it is still ON, the operation proceeds to step S15, where it is judged whether the head shift instructing switch HS1 is ON or not. If the head shift instructing switch HS1 is not ON, the operation goes back to step S10. After that, the sequence for drop-out compensation is performed again. If the head shift instructing switch HS1 is ON, the operation goes back to step S3, where the head shift operation and discrimination to determine whether the recording signal of the new track is a high-band or a low-band one are performed again.

While the above embodiment has been described with respect to the two frequency allocations shown in FIG. 1 and 2, the present invention is also effective for other allocations as long as they exhibit different sync. tip frequencies. It is also possible to perform discrimination allocation on more than two different frequency allocations. This may be realized by providing another frequency detector in the present embodiment or by augmenting the number of types of the time constants of the monostable multivibrator to perform judgment sequentially.

As described above, the embodiment of the present invention makes it possible to discriminate to determine whether a recording has been effected with the low-band FM image signal or the high-band FM image signal, so that an optimum reproduction condition can be set quickly without using ID signals or the like. Further, when one checks the tracks, in inserting a jacket containing a floppy disk into the apparatus, to see whether recording has been effected, one can also judge the recording condition and store the judgment result in the memory. This is advantageous because the following operation of the reproducing apparatus is expedited. Further, it is economical since it also serves as the drop-out detector. The present invention is naturally also effective for discriminating the modulation condition of a modulation signal transmitted as well as for discriminating the band of a recorded signal.

In accordance with this invention, the modulation condition of a modulation signal can be quickly discriminated from this modulation signal without using ID signals or the like.

What is claimed is:

1. An information signal discriminating apparatus adapted to ascertain the type of an information signal modulated by one of a plurality of types of modulation carrier signals having respective different frequencies, said information signal including a synchronizing signal, said information signal discriminating apparatus comprising:
   (A) comparing means receiving said information signal, for comparing the information signal with a comparison reference having a predetermined level and for outputting a binary signal in accordance with the comparison result;
   (B) pulse signal generating means receiving the binary signal output from said comparing means, for outputting a pulse signal having a predetermined pulse width in synchronization with the rising of said binary signal;
   (C) latching means for latching the pulse signal output from said pulse signal generating means in synchronization with the rising of the binary signal output from said comparing means, to output a latched signal; and
   (D) discriminating means for forming and outputting a discriminating signal in accordance with the frequency at the time of period corresponding to a sync, tip portion, by using said latched signal outputted from said latching means.

2. An information signal discriminating apparatus according to claim 1, wherein said discrimination means includes second latching means for latching the signal output from said latching means in synchronization with the horizontal synchronizing signal to output the latched signal as a discrimination signal.

3. An information signal discriminating apparatus according to claim 2, wherein said information signal includes a first image signal which is frequency-modulated by a modulation carrier signal with a first frequency, and a second image signal which is frequency-modulated by a modulation carrier signal with a second frequency which is higher than said first frequency, each of said first image signal and said second image signal including horizontal and vertical synchronizing signals.

4. An apparatus according to claim 3, wherein said pulse signal generating means is arranged to output a pulse signal having a pulse width shorter than one period of the modulated carrier during a horizontal synchronizing period of said first image signal and longer than one period of the modulated carrier during the horizontal synchronizing period of said second image signal, in synchronism with a rising of the binary signal fed from said comparing means.

5. An information signal processing apparatus adapted to process an information signal modulated by one of a plurality of types of modulated carrier signals having respective different frequencies and including a synchronizing signal, said information signal processing apparatus comprising:

(A) pulse signal forming means arranged to input said information signal, for forming and outputting a pulse signal synchronized with the modulated carrier signal of synchronizing signal included in the received information signal;

(B) pulse signal output means for outputting a plurality of types of pulse signals having respective different pulse widths in synchronization with the pulse signal output from said pulse signal forming means;

(C) condition detecting signal output means for detecting the condition of the information signal in accordance with the condition of the pulse signals output from said pulse signal output means to output a condition detecting signal indicative of the condition of the information signal;

(D) processing means, arranged to input said information signal for processing the input information signal in accordance with the condition detecting signal output from said condition detecting signal output means; and (E) control means for controlling the pulse widths of the pulse signals output from said pulse signal output means in accordance with the condition detecting signal output form said condition detecting signal output means.

6. An apparatus according to claim 7, wherein said processing means includes means for demodulating the information signal and de-emphasis means which receives the demodulated signal of said information signal, compensates for the high-band frequency component of the received signal in accordance with the condition detecting signal outputted form said condition detecting means and then outputs the same.

7. An apparatus according to claim 6, wherein said de-emphasis means includes:

(A) a plurality of de-emphasis circuits for receiving the demodulated signal of said information signal and for effecting compensation of the high-band frequency component, to the received signal, on the basis of different compensation characteristics; and (B) selection circuit for selecting one kind of signal among a plurality of kinds of signals, the high-band frequency components of which have been compensated for by the plurality of de-emphasis circuits, in accordance with the condition detecting signal outputted from said condition detecting signal output means and for outputting the selected kind of signal.

8. An information signal processing apparatus according to claim 5, wherein said pulse forming means includes comparison means, arranged to input said information signal, for comparing the input information signal with a comparison reference having a predetermined level, to output a binary signal in accordance with the comparison result.

9. An information signal processing apparatus according to claim 8, wherein said pulse signal output means is arranged to input the binary signal output from said comparing means and to output a plurality of types of pulse signals having respective different pulse widths, in synchronization with the rising of the input binary signal.

10. An information signal processing apparatus according to claim 9, wherein said condition detecting signal output means includes:

(A) first latch means for latching the pulse signals output from said pulse signal output means in synchronization with the rising of the binary signal output from said comparing means to output a latched signal; and (B) second latch means for latching the signal output from said first latch means in synchronization with a horizontal synchronizing signal to output the latched signal as the condition detecting signal.

11. An information signal processing apparatus according to claim 10, wherein said information signal includes a first image signal which is frequency-modulated by a modulation carrier signal with a first frequency, and a second image signal which is frequency-modulated by a modulation carrier signal with a second frequency which is higher than said first frequency.

12. An apparatus according to claim 11, wherein said pulse signal output means is arranged to selectively output the first pulse signal having the pulse width shorter than one period of the modulated carrier during the horizontal synchronizing period of said first image signal or the second pulse signal having the pulse width longer than one period of the modulated carrier during the horizontal synchronizing period of said second image signal, in synchronism with the rising of the binary signal fed from said comparison means, in accordance with the condition detecting signal outputted from said condition detecting signal output means.

13. An apparatus according to claim 12, said information signal processing means further comprises means for demodulating the first and second image signals and drop-out compensating means for receiving the demodulated signal of said first image signal or the demodulated signal of said second image signal, for detecting a drop-out portion of the received signal, by using said first pulse signal or said second pulse signal selectively outputted from said pulse signal output means and for compensating for the drop-out portion of said signal and outputting the compensated signal.

* * * * *